(No Model.)
O. W. GODKIN.
ADJUSTABLE LID AND DRAINER FOR COOKING VESSELS.
No. 364,341. Patented June 7, 1887.
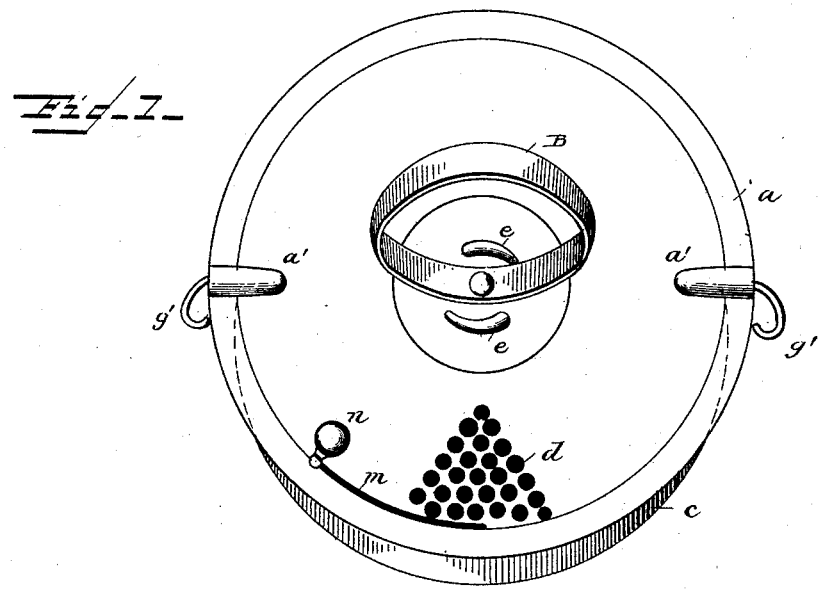
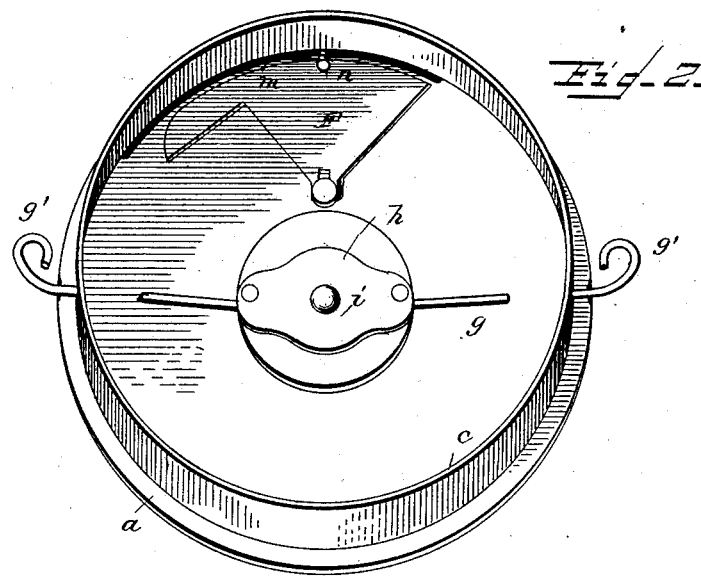
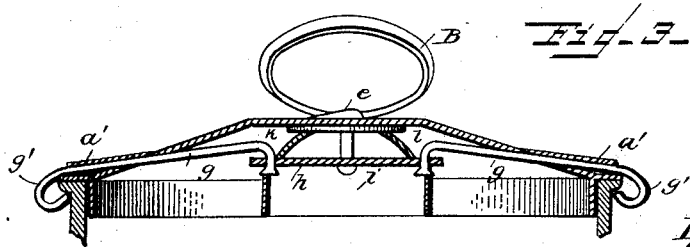
Witnesses:
Edwin T. Yewell
Wm. F. Huntemann
Inventor,
Otto W. Godkin
by G. B. Harris
asso. atty.

United States Patent Office.

OTTO W. GODKIN, OF BERKELEY, CALIFORNIA.

ADJUSTABLE LID AND DRAINER FOR COOKING-VESSELS.

SPECIFICATION forming part of Letters Patent No. 364,341, dated June 7, 1887.

Application filed June 12, 1886. Serial No. 205,002. (No model.)

*To all whom it may concern:*

Be it known that I, OTTO W. GODKIN, a resident of Berkeley, county of Alameda, State of California, have invented a new and useful Adjustable Draining-Lid for Cooking Utensils; and I hereby declare that the following is a full, clear, and exact description of the same, reference being had to the accompanying drawings.

My invention is a lid or cover which is adjustable to pots and kettles and similar vessels, whereby the same may be drained with facility and safety.

The following description fully explains the nature of my said invention and the manner in which I proceed to construct, apply, and use the same, the accompanying drawings being referred to by figures and letters.

Figure 1 is a plan view showing the means for adjusting the lid to a vessel and the drainage-holes. Fig. 2 is the same, looking from underneath, showing the manner of attaching the lid to the rim of a vessel and the sliding cover for the drainage. Fig. 3 is a vertical section through the lid, showing the attachment of the adjustable arms.

The object of my invention is to provide a lid or cover which can be adjusted to a pot or kettle or similar cooking utensil in such a manner as to prevent the lid from falling off while the vessel is drained of hot water and without risk of scalding the person handling the vessel. I accomplish this by constructing the cover or lid $a$ in the ordinary form, with a flange, $c$, to fit over the vessel. A handle, $b$, is attached rigidly to a rivet or securing-pin, $i$, which extends through the lid through a washer, $k$, on the under side thereof, through a metallic spring-washer, $l$, in the shape of an inverted saucer, and a plate, $h$, on which said spring rests. An adjustable arm, $g$, made of steel wire, is attached to each end of the plate $h$, the end of which passes loosely through a covered recess or channel, $a'$, in the lid near the edge, and thence outside, and is formed into a hook for the purpose of catching under the rim of the vessel and holding the lid in position. On the top of the lid, on each side of the pin $i$, I arrange a piece of wire, $e$, curved in the form of a horn and having the points in opposite directions for the action of the handle in adjusting the arms to the vessel. Near the edge of the lid are drainage-holes $d$, which are covered on the under side by a sliding plate, $f$, which is moved by a button, $n$, attached to the plate through the lid and working in a slot, $m$, in the lid.

In applying my adjustable lid to a vessel of ordinary form, in which the diameter is not diminished at the rim, the handle $b$ is turned to the right, which action causes the inner and outer edges of the handle to move up the curves of the horn-shaped wires $e$, Fig. 1, whereby the arms $g$ are raised and drawn in and their hooked ends $g'$ catch under the rim of the vessel and hold the lid securely in place. The saucer-shaped piece of metal $l$, which is set on the pin $i$ between the washer $k$ and the plate $h$, Fig. 3, has the action of a spring and regulates the tension of the adjustable arms. In draining the water, the drainage-holes $d$ are uncovered by moving the sliding plate $f$ by the button $n$.

Having thus fully described my invention, what I claim, and desire to secure by Letters Patent, is—

The combination, with the lid, of the plate $h$, the arms attached thereto and having hooked ends, the spring-washer $l$, the washer $k$, the handle $b$, having the securing-pin $i$, and the wires $e$, substantially as set forth.

OTTO W. GODKIN. [L. S.]

Witnesses:
 A. B. SMITH,
 FERDINAND IMHORST.